United States Patent [19]
Korenshtein

[11] Patent Number: 5,917,498
[45] Date of Patent: Jun. 29, 1999

[54] MULTI-OBJECT VIEWS IN AN OBJECT MODELING TOOL

[75] Inventor: Roni Korenshtein, Los Gatos, Calif.

[73] Assignee: International Business Machines Corporation, Armonk, N.Y.

[21] Appl. No.: 08/747,416

[22] Filed: Nov. 12, 1996

[51] Int. Cl.$^6$ .................................................. G06F 3/00
[52] U.S. Cl. ........................... 345/433; 345/340; 345/344
[58] Field of Search .................................. 345/433, 340, 345/333, 334, 335, 343, 344, 345

[56] References Cited

U.S. PATENT DOCUMENTS

| | | |
|---|---|---|
| 4,845,665 | 7/1989 | Heath et al. . |
| 5,247,651 | 9/1993 | Clarisse . |
| 5,257,363 | 10/1993 | Shapiro et al. . |
| 5,315,709 | 5/1994 | Alston, Jr. et al. . |
| 5,325,533 | 6/1994 | McInerney et al. . |
| 5,390,320 | 2/1995 | Smithline . |
| 5,390,330 | 2/1995 | Talati . |
| 5,421,015 | 5/1995 | Khoyi et al. . |
| 5,437,037 | 7/1995 | Furuichi . |
| 5,515,497 | 5/1996 | Itri et al. . |
| 5,528,503 | 6/1996 | Moore et al. . |
| 5,537,630 | 7/1996 | Berry et al. . |
| 5,542,040 | 7/1996 | Chang et al. . |
| 5,555,365 | 9/1996 | Selby et al. . |
| 5,557,518 | 9/1996 | Rosen . |

OTHER PUBLICATIONS

Citrin, Wayne, et al., "Using Formalized Temporal Message-flow Diagrams," *Software—Practice and Experience*, vol. 25, No. 12, pp. 1367–1401, Dec. 1995.

Coats, Mark, et al., "Constructing Operational Specifications," *Dr. Dobb's Journal of Software Tools for Professional Programmer*, vol. 20, No. 6, pp. 18–33, Jun. 1995.

De Man, Josef, et al., "Towards a formal Semantics of Message Sequence Charts", *SDL 93 using Objects. Proceedings of the Sixth SDL Forum 1993*, pp. 157–165, 1993.

De Man, Jozef, et al., "Developing Formal Specifications with Message Sequence Charts", *XIV International Switching Symposium*, vol. 2, pp. 134–137, Oct. 1992.

Ek, Anders, "Verifying Message Sequence Charts with the SDT Validator," *SDL '93, Using Objects. Proceedings of the Sixth SDL Forum 1993*, pp. 237–249.

Grabowski, Jens, et al., "The Standardization of Message Sequence Charts," *Proceedings 1993: Software Engineering Standards Symposium*, pp. 48–63, 1993.

Graubmann, Peter, et al., "Towards a Petri Net Based Semantics Definition for Message Sequence Charts,"*SDL 93: Using Objects*, pp., 179–190, 1993.

Hadzilacos, Thanasis, et al., "Transaction Synchronisation in Object Bases", *Journal of Computer and System Sciences*, vol. 43, pp. 2–24, 1991.

Ito, Atsushi, et al., "Transformation Technique Between Specification in SDL and Specification in Message Sequence Charts for Designing Protocol Specifications," *Supercomm/ICC '92: Discovering a New World of Communications*, IEEE vol. 1, pp. 0442–0447, 1992.

(List continued on next page.)

*Primary Examiner*—Phu K. Nguyen
*Assistant Examiner*—Cliff N. Vo
*Attorney, Agent, or Firm*—Merchant, Gould, Smith, Edell, Welter, & Schmidt

[57] ABSTRACT

A method, apparatus, and article of manufacture for displaying objects in an object-oriented system. A first view is graphically displayed on a monitor attached to a computer, wherein the first view displays one or more objects therein. A second view is also graphically displayed on the monitor attached to the computer, wherein a specified relationship is defined from the first view to the second view. When an action is performed in the first view it causes a modification to the second view in accordance with the specified relationship.

45 Claims, 11 Drawing Sheets

OTHER PUBLICATIONS

Ladkin, Peter B., et al., "What do Message Sequence Charts Mean?", *IFIP Trans., C. Commun. Syst.*, vol. C, No. 22, pp. 301–316, 1994.

Ladkin, Peter B., et al., "Interpreting Message Flow Graphs," *Formal Aspects of Computing 1995*, vol. 7, No. 5, pp. 473–509, 1995.

Mauw, S., et al., "An Algebraic Semantics of Basic Message Sequence Charts," *The Computer Journal*, vol. 37, No. 4, pp. 269–277, 1994.

Mauw, S., et al., "A Formal Semantics of Synchronous Interworkings," *SDL '93 Using Objects: Proceedings of the Sixth SDL Forum 1993*, pp. 167–178.

Moriyasu, Kenji, et al., "A Method of Applying Message Sequence Chart Specifications for Services with Variant Process Structure," *Electronics and Communications in Japan*, Part 1, vol. 78, No. 9, pp. 12–24, 1995.

Okamoto, Mitsuhiro, et al., "A Verification Scheme for Service Specifications Described by Information Sequence Charts," *IEICE Trans. Commun.*, vol. E75–B, No. 10, pp. 978–985, Oct. 1992.

Thrampoulidis, K.X., et al., "Object Interaction Diagram: A New Technique in Object–oriented Analysis and Design," *Journal of Object–Oriented Programming*, vol. 8, No. 3, pp. 25–32, Jun. 1995.

Mastering WordPerfect for Windows, Sybex Inc. pp. 415–444, 1993.

MULTI-OBJECT VIEWS IN AN OBJECT MODELING TOOL

CROSS-REFERENCE TO RELATED APPLICATIONS

This application is related to the following co-pending and commonly-assigned patent applications:

Application Ser. No. 08/747,415, entitled "METHOD FOR SYNCHRONIZING CLASS, METHODS, ATTRIBUTES AND OBJECT PROPERTIES ACROSS AN OBJECT-ORIENTED SYSTEM," filed on same date herewith, by Stephen A. Brodsky, Timothy J. Grose and Roni Korenshtein;

Application Ser. No. 08/747,414, entitled "LAYOUT METHOD FOR ARC-DOMINATED LABELLED GRAPHS," filed on same date herewith, by Subrata Mitra and Dipayan Gangopadhyay;

Application Ser. No. 08/747,417, entitled "NOTIFICATION MANAGER FOR AN OBJECT-ORIENTED SYSTEM," filed on same date herewith, by Stephen A. Brodsky and Timothy J. Grose;

Application Ser. No. 08/747,057, entitled "INTERACTIVE MODELING AGENT FOR AN OBJECT-ORIENTED SYSTEM," filed on same date herewith, by Stephen A. Brodsky and Rebecca Mei-Har Lau;

Application Ser. No. 08/747,058, entitled "EXECUTION ENGINE IN AN OBJECT MODELING TOOL," filed on same date herewith, by Stephen A. Brodsky, Gary C. Doney, Dipayan Panwar, and Subrata Mitra;

all of which applications are incorporated by reference herein.

BACKGROUND OF THE INVENTION

1. Field of the Invention

This invention relates generally to object-oriented environments, and in particular to a graphical user interface for an object-oriented modelling tool.

2. Description of Related Art

In object-oriented modelling tools, there is often a need to graphically create and display classes, objects, and attributes in the object model. Graphical user interface (GUI) applications exist that allow a user to create objects such as files, classes, documents, and pictures, and to further specify values for attributes of these objects. The user sees the names or some rudimentary graphical representation of all the objects in one context, and a detailed view of each object in a different context. When there is a large number of objects, it is impractical for GUI applications to show all the details of all objects in the same view or window. GUI developers must fabricate views to show all objects in one window, and information specific to a given object in another window. In order to assist users in viewing the object model, current modelling tools either have several windows, one for each object, or one window divided into several panes.

The first approach has the user perform the action of opening a view of an object, and having a new window created to display the view information for that object. Selecting the open action for another object results in opening another separate window for the second object. A window displays information for a single specific object during its entire existence (from creation to its closing). If the underlying object is deleted, the window becomes invalidated and is usually closed upon the deletion of the object. Opening views for three objects results in three new windows each containing the view of one of the objects. If a view of an object is opened, a new window opens even if there is a similar view already open for the same object.

There are many shortcomings of a design tool having one object per view in an object model having many homogeneous objects and where the user is constantly adding and updating the details of many objects in a random order. The screen is limited by how many such views can be displayed comfortably on it at the same time, and every open action results in a new window covering an area of the screen. It takes time to create each view since the window may have several GUI controls. For example, a notebook view may contain many pages and there may be many GUI controls in each page. The creation and destruction of such a view each time may be costly. Since the windows may overlap or completely cover other windows, it takes time and effort by the user to switch from one object's view to a view of another object. Views are opened in some default manner, which results in showing the top most page of a document or in the case of notebooks, for example, notebooks are usually opened with the first (left most or top most) page as the top page. If the user wants to check some specific information which is located at some page of the notebook or the view, for several objects, the user has to open a view for each of these objects in turn, and for each opened view the user needs to scroll to the place containing the information of interest, or, in the case of a notebook, click on the tab of the page which contains the information of interest.

The second approach is to show several panes within the GUI application window. One pane shows the list of all objects, and another pane shows information for an object. Selecting an object in the first pane results in the object's information shown in the other pane. There are many shortcomings of a design tool having multiple panes in an object model having many objects. The same window contains the list view having a list of the objects and the object's information view. All communication between the views is intra-window. There is no way to separate these views into separate windows, and there is usually no way to create or open another view of either just the list or just the object's information view. Sometimes the user can open another window which contains all of these views or panes. The GUI application window area needs to be divided into -smaller areas (instead of having independent windows, each being possibly as big as the screen), so less information may be displayed in each. These panes are always in the same orientation to each other and when one moves they all move respectively (instead of being manipulated independently). The panes implementation usually does not allow opening another view of just the information in one of its panes. It may allow duplication of the whole window, which will then contain information that the user is not interested in. When one pane increases in size, another pane will have to decrease in size since all panes have to fit in the same window size. It may be impossible to set the sizes of each pane as the user would ideally desire. This is dependent on the number of panes and their orientation. Although a GUI designer may want to partition the information in an object into several sets, such as attributes set, methods set, etc., so the user does is not overwhelmed by all the information for a given object being presented in the same pane, there may be a need to see all aspects of a few of these sets whenever a different object is selected. One way to accomplish this is to create a pane for each set. This again reduces the size of each pane and the amount of information it may be able to display on the screen, and often not all panes are always needed by the user.

SUMMARY OF THE INVENTION

To overcome the limitations in the prior art described above, and to overcome other limitations that will become apparent upon reading and understanding the present specification, the present invention discloses a method, apparatus, and article of manufacture for displaying objects in an object-oriented system. A first view is graphically displayed on a monitor attached to a computer, wherein the first view displays one or more objects therein. A second view is also graphically displayed on the monitor attached to the computer, wherein a specified relationship is defined from the first view to the second view. When an action is performed in the first view it causes a modification to the second view in accordance with the specified relationship.

In one embodiment of the present invention, the first view comprises a multi-object view that displays information relating to a current object. The user can then select a new current object from a set of objects shown in the multi-object view.

In another embodiment of the present invention, a second view comprises an index window that displays a set of objects. The user can also select a new current object from the set of objects shown in an index window.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention provides an object modelling tool for use in object-oriented environments in creating and manipulating objects in an object model. The object modelling tool provides a Multi-Object View for displaying contents or information related to many objects in a single window, one at a time, and an Index Window for selecting an object to perform an action on. A typical action may be switching the object whose information is displayed in the Multi-Object View to the object selected in the Index Window by opening the object in the Index Window (by performing the "Open Properties View" action on the object).

The Multi-Object notebook is a single window displaying a set of view information for all objects of a given type. The Multi-Object View may be created or destroyed only once during the execution of the object modelling tool. There is no need to search among many views since there is only one view. The view location (current scroll position or current page in a notebook) is not affected as the contents of the notebook changes. The list of objects to view is in a window by itself and the object's information is in another window, so it is possible that each window size be as big as the screen. These windows can be moved so they are in any orientation to each other as the user prefers, and they may be moved independently of each other. The user may open more views of the same object information view. Each window is manipulated independently and its size has no effect on the size of any other window. Each window can be sized exactly as the user would like. The user may open several different windows, each showing a particular set of the object's information, and all these windows change their contents based on the currently selected object.

Hardware Environment

Figure 1:
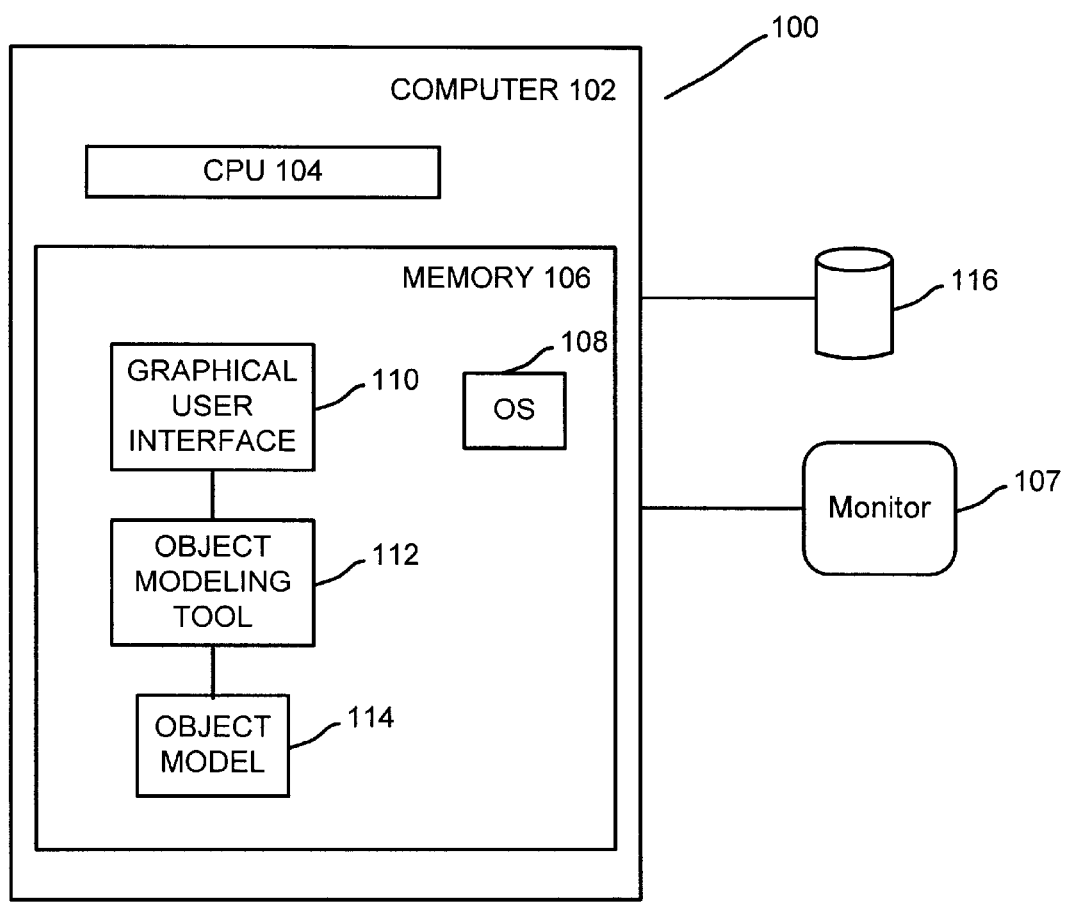
FIG. 1 illustrates an exemplary computer system that could be used to implement the present invention.

FIG. 1 illustrates an exemplary computer system 100 that could be used to implement the present invention. The computer 102 comprises a processor 104 and random access memory (RAM) 106. The computer 102 may be coupled to coupled to other devices, such as a monitor 107, a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106. The present invention is preferably implemented using one or more data structures and computer programs operating under the control of the operating system 108. More specifically, the present invention includes a graphical user interface 110, an object modelling tool 112, and an object model 114.

In the preferred embodiment, the operating system 108, graphical user interface 110, object modelling tool 112, and object model 114, are all tangibly embodied in a computer-readable medium, e.g., data storage device 116, which could include one or more fixed or removable data storage devices, such as a zip drive, floppy disc drive, hard drive, CD-ROM drive, tape drive, etc. Further, the operating system 108, graphical user interface 110, object modelling tool 112, and object model 114 are all comprised of instructions which, when read and executed by the computer 102, causes the computer 102 to perform the steps necessary to implement and/or use the present invention. Of course, those skilled in the art will recognize many modifications may be made to this configuration without departing from the scope of the present invention.

Multi-Object View

The present invention provides an object modelling tool 112 for creating and manipulating objects in the object model 114. The object modelling tool 112 according to the present invention provides a Multi-Object View for displaying contents or information related to many objects, one at a time, and an Index Window for selecting an object to perform an action on. A typical action may be switching the object whose information is displayed in the Multi-Object View to the object selected in the Index Window by opening the object in the Index Window. In the exemplary embodiment presented herein, the Multi-Object View is a single window displaying a set of view information for all objects of a given type, i.e. homogenous objects. A Multi-Object View may also be an Index Window in that an object to perform an action on may be selected from the Multi-Object View.

Figure 2:
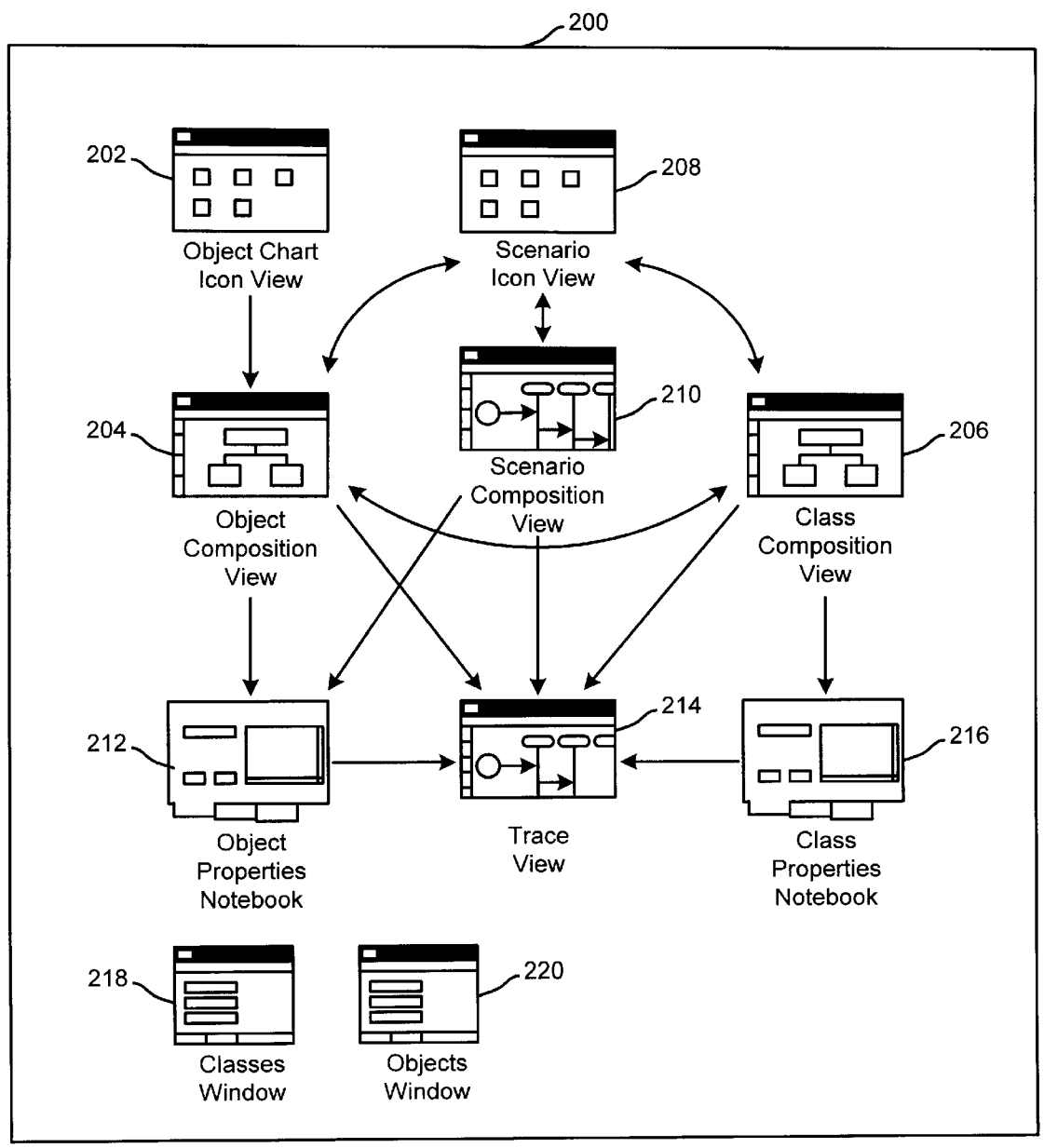
FIG. 2 shows a number of different windows or views in a graphical user interface displayed on a monitor of the computer by the object modelling tool of the present invention.

FIG. 2 shows a number of different windows or views in a graphical user interface (GUI) 110 displayed on a monitor 107 of the computer 102 by the object modelling tool 112 of the present invention, wherein these views are used to interact with the user in the construction of an object model 114 or its component parts. The GUI 110 includes a number of different views, including an ObjChart™ Icon View 202, an Object Composition View 204, a Class Composition View 206, a Scenario Icon View 208, a Scenario Composition View 210, an Object Properties Notebook 212, a Trace View 214, a Class Properties Notebook 216, a Class Window 218, and an Object Window 220.

In the exemplary embodiment presented herein, the Multi-Object View may be the Object Properties Notebook 212 and the Class Properties Notebook 216. The Index Window may be the Object Composition View 204, the Class Composition View 206, and the Scenario Composition View 210, or an object selection mechanism internal to the Multi-Object View, such as a menu item or button bar.

Figure 3A:
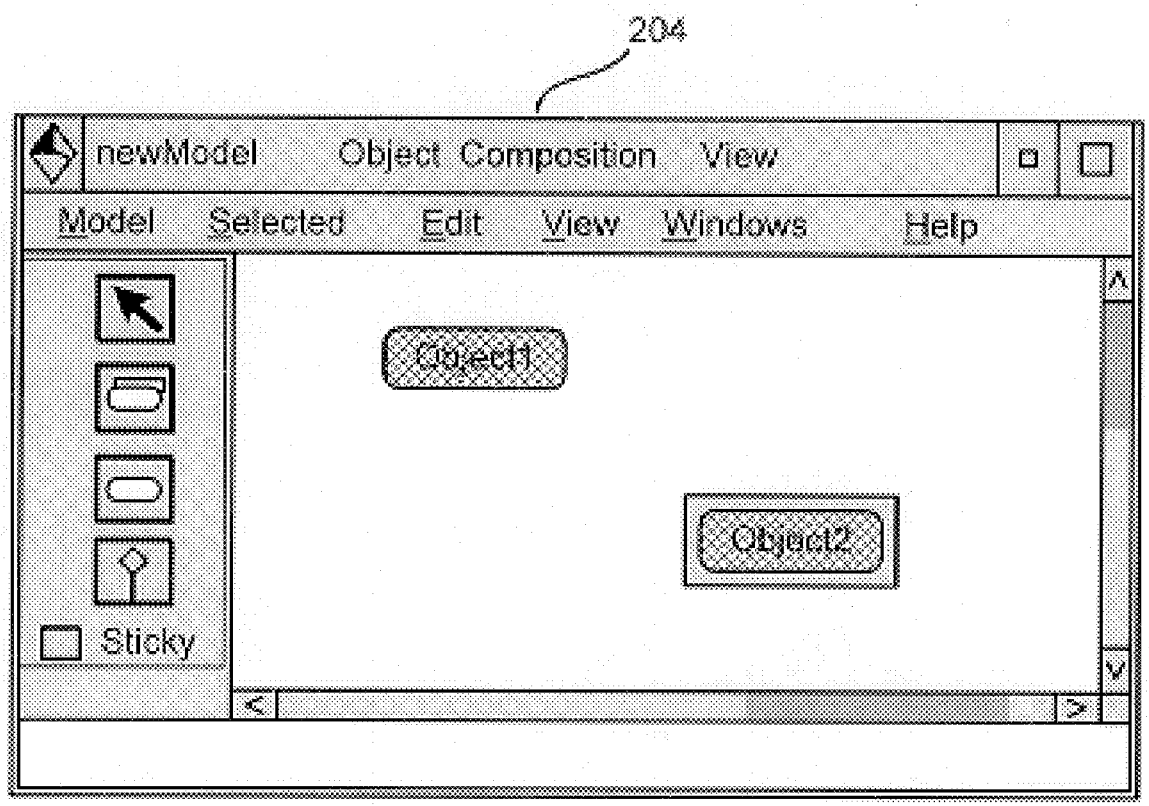
FIGS. 3A–3F are illustrations of a user interface that provide an example of the operation of the object modelling tool according to the present invention.

FIGS. 3A–F are illustrations of a graphical user interface 110 according to the present invention. FIG. 3A illustrates the Object Composition View 204. The Object Composition View 204 is a view of all the objects in the object model 114. Each Object is shown in some rudimentary form in the Object Composition View 204.

Figure 3B:
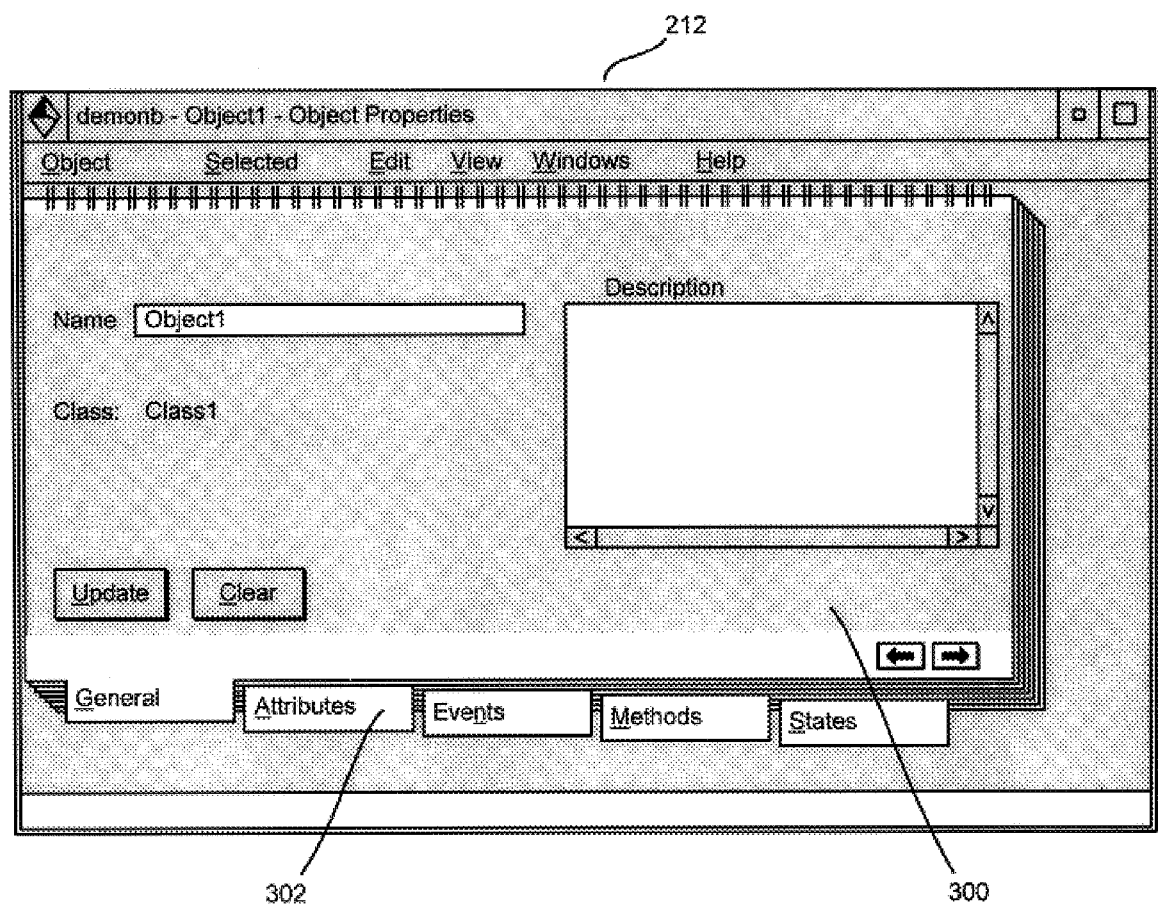
Figure 3C:
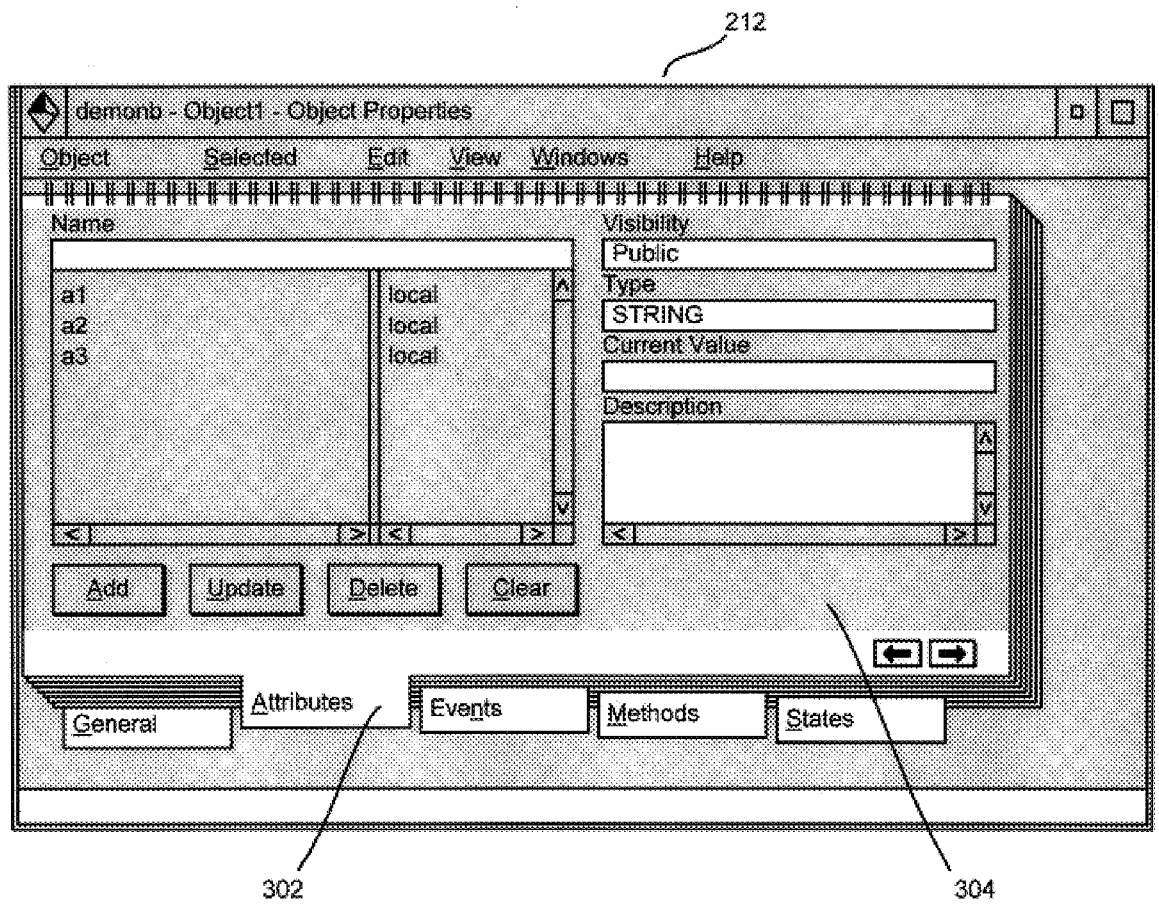

FIG. 3B illustrates the Object Properties Notebook 212. The Object Properties Notebook 212 appears when the user performs the action "Open Properties View" on an object (e.g., Object1). It shows the object's properties 212 for the related object (e.g. Object1). The Object Properties View shows the details of a specific object. The Object Properties Notebook 212 is a collection of views on a given object. The Object Properties Notebook 212 has several pages, each containing some category of details of the object (attributes, methods, etc.). By clicking on the different tabs, the different pages are brought to the top, showing the page's details of the object. Initially, when the Object Properties Notebook 212 is first opened, the Object Properties Notebook 212 shows by default the first page 300 which is labeled "General." Clicking on the Attributes tab 302 results in the Attributes page 304 being brought to the top, as illustrated in FIG. 3C. The attributes page 304 shows the attribute details of the object.

In an exemplary embodiment according to the present invention, the object properties are displayed in a multi-object notebook or in a single-object notebook. The multi-object notebook is a view or a collection of views of one or more objects. The single-object notebook is a view or a collection of views of one object, and allows for comparisons of one object's properties with another and for viewing two different views of the same object.

The multi-object notebook has a "current object," which is the object whose details are currently being displayed, and may have an object selection mechanism for changing the current object. Changing the current object of the notebook results in the notebook updating it's title and its contents to reflect the details of the newly selected "current object." Upon changing the current object, the only immediately visible changes to the multi-object notebook are the title changes to reflect the new current object, and the contents change in the current top page of the notebook to reflect the details of the newly selected "current object." Fields are filled in with the new text, diagrams, pictures, etc., based on information from the newly selected object. Upon clicking on another page's tab, the notebook will show the information from the current object as it is relevant to this newly selected page.

The object selection mechanism for changing the current object may be built in to the multi-object view, or it may be external. A built-in mechanism would be a menu item or a button displayed in the notebook, which when clicked on presents the user with a list of the objects in the system. Upon selecting one of these objects, it becomes the "current object" of the multi-object notebook. An external selection mechanism may be in a second window, for example, the Index Windows Object Composition View 204, Class Composition View 206, and Scenario Composition View 210 which display a set of objects that may be selected.

View to View Relationship

A View to View relationship defines the relationship between an Index Window and a Multi-Object View over some action, e.g. the relationship between the Object Composition View 204 and the Object Properties Notebook 212. The action may be a select or open action. This relationship is such that the user can change the "current object" in the Multi-Object View by selecting the specified action (over which this relationship between the two views is specified) on the graphical object in the Index Window, and as a result the Multi-Object View will display the contents of the new current object.

In an exemplary embodiment according to the present invention, the Object Composition View 204 is the Index Window for selecting a current object. It has an "Open object properties" relationship, or action, with the Object Properties Notebook 212, which is a Multi-Object View. The Object Composition View 204 is shown in FIG. 3A. In the -exemplary embodiment described herein, the "Open object properties" action may be performed by double clicking on the object or by selecting the default "Open object properties" menu action in the Object Composition View 204.

Upon selecting the "Open object properties" action on Object1 in the Object Composition View 204, the Object Properties Notebook 212 is opened as shown in FIG. 3B. When the Object Properties Notebook 212 is opened it defaults to showing the first page 300 in the notebook, which is labeled "General."

Figure 3D:
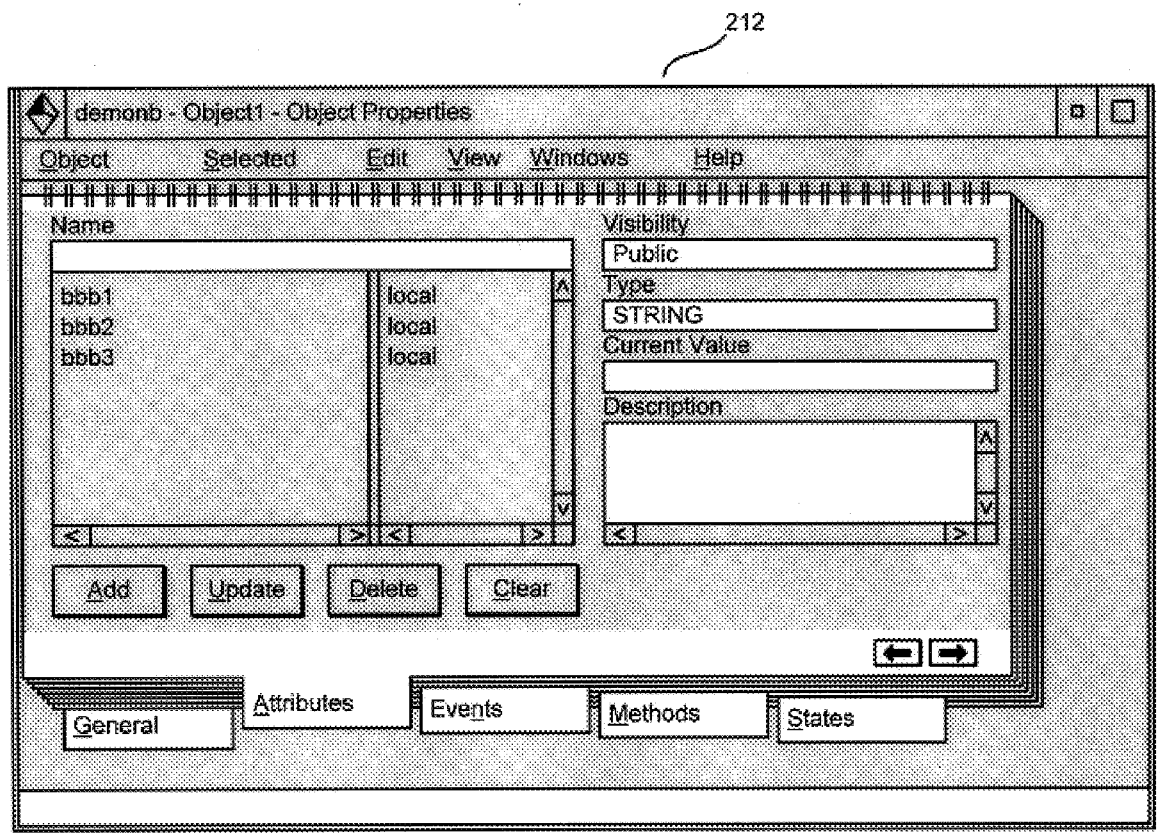

FIG. 3C shows the Object Properties Notebook 212 after the user switched to the Attributes page 304 by clicking on the Attributes tab 302. FIG. 3D shows the Object Properties Notebook 212 after the user has selected the default "Open object properties" action on Object2 in the Object Composition View 204. By executing the "Open object properties" on Object2 in the Object composition view 204, the user has requested to open the properties view of Object2. Since the Multi-Object notebook, Object Properties Notebook 212, is already open, and there exists a view to view the relationship between the Object composition view 204 and the Object Properties Notebook 212 over the "Open object properties"

action, the user's action triggers the changing of the Object Properties Notebook's 212 "current object" from its previous setting of Object1 to Object2.

The Object Properties Notebook's 212 current object becomes Object2, and the title of the Object Properties Notebook 212 changes to reflect that, as well as the contents of the Object Properties Notebook 212 change to reflect Object2's attributes. The details of the other pages of the Object Properties Notebook 212 will show Object2's information relevant to each page when the user clicks on the tab for that page, but the top page immediately shows the contents of Object2 now, as illustrated in FIG. 3D.

Single-Object View

The single-object view is a view or a collection of views of one object. The single-object view allows for comparisons of one object properties with another and for viewing two different views of the same object. In an exemplary embodiment according to this invention, the graphical user interface 200 provides a standard mechanism for allowing the user to open a "Single-Object" view. The context sensitive pop-up menu, which pops-up when the user points the mouse at the object in the Object Composition View 204 and clicks on the right button, contains a menu item called "Open Properties View." This item may be cascaded into either "New notebook" or "Replacement notebook." The user may choose one of the refined cascaded actions or just select the "Open Properties View" which defaults to "Replacement notebook." In the exemplary embodiment according to this invention, the replacement notebook is the multi-object notebook.

If the user selects "Open object properties"—"New notebook," a new single-object notebook is opened regardless is of whether the multi-object notebook is already open, or whether there is another single-object notebook for the same object open already.

If the user selects the "Open object properties"—"Replacement notebook" or the default "Open object properties" menu action, or simply double clicks on the object, the View to View relationship is activated defining an action to perform between the Object Composition View 204 and the multi-object notebook.

If the multi-object notebook is not opened yet, it is opened at the first page, which is the default first page when opening the notebook. The multi-object notebook title shows the name of the selected object and the contents of the notebook are initialized to show the details of the selected object.

If the multi-object notebook is open already, then its title and its contents change to reflect the information from the newly selected object.

Figure 3E:
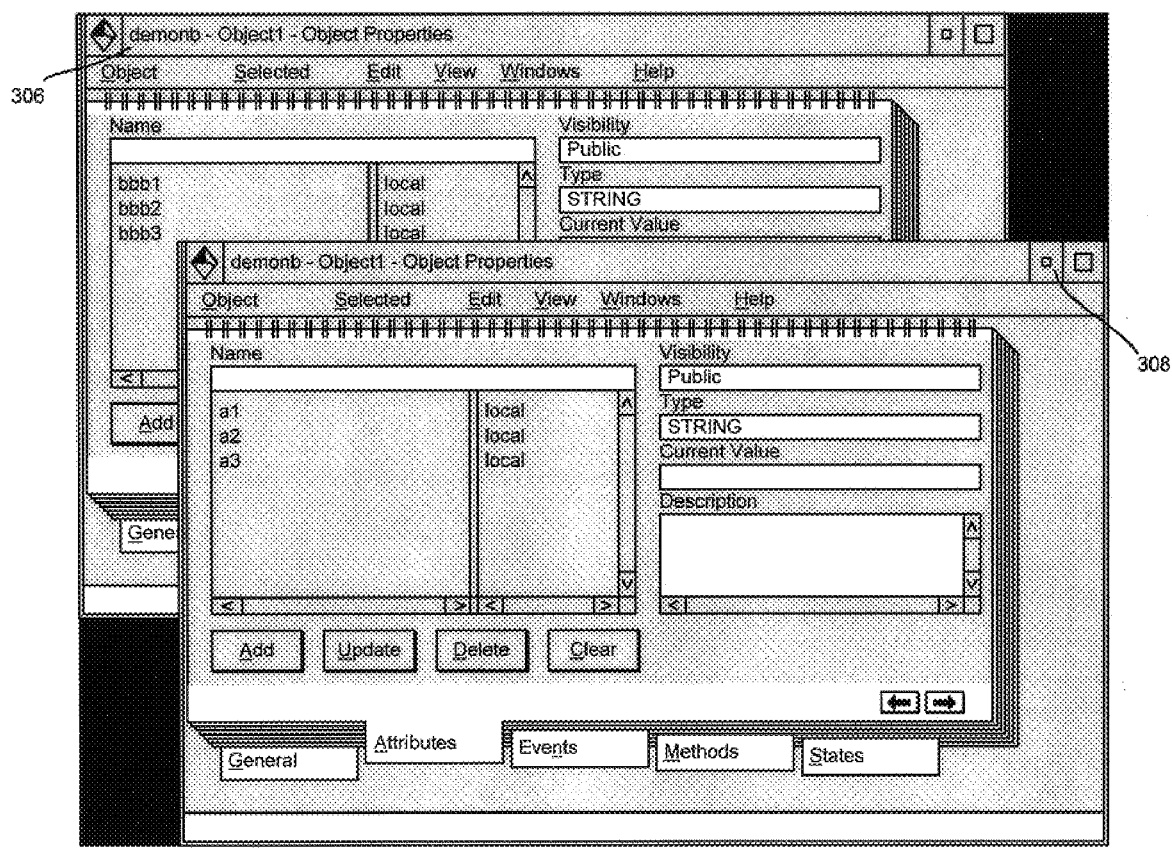

FIG. 3E illustrates two Object Properties Notebooks 212, one is a Multi-Object Notebook 306 and the other is a Single-Object Notebook 308. In the exemplary embodiment presented herein, the Multi-Object Notebook 306 has the same look and feel as the Single-Object Notebook 308, although they may be designed to be distinguished in some graphical way.

The Single-Object Notebook 308 is insensitive to the Object Composition View 204 because it does not have the View to View relationship with it. Selecting the "Open object properties" action for any other object in the Object Composition View 204 will not affect the Single-Object Notebook 308. It will continue to display the contents of the object for which it was created.

The Multi-Object Notebook 306, on the other hand, has the view to view relationship with the Object Composition View 204, in that the Object Composition View 204 is the Index Window for the Multi-Object Notebook 306. Selecting the "Open object properties" action for any object in the Object Composition View 204 will change the contents of the Multi-Object Notebook 306 and its current object.

Figure 3F:
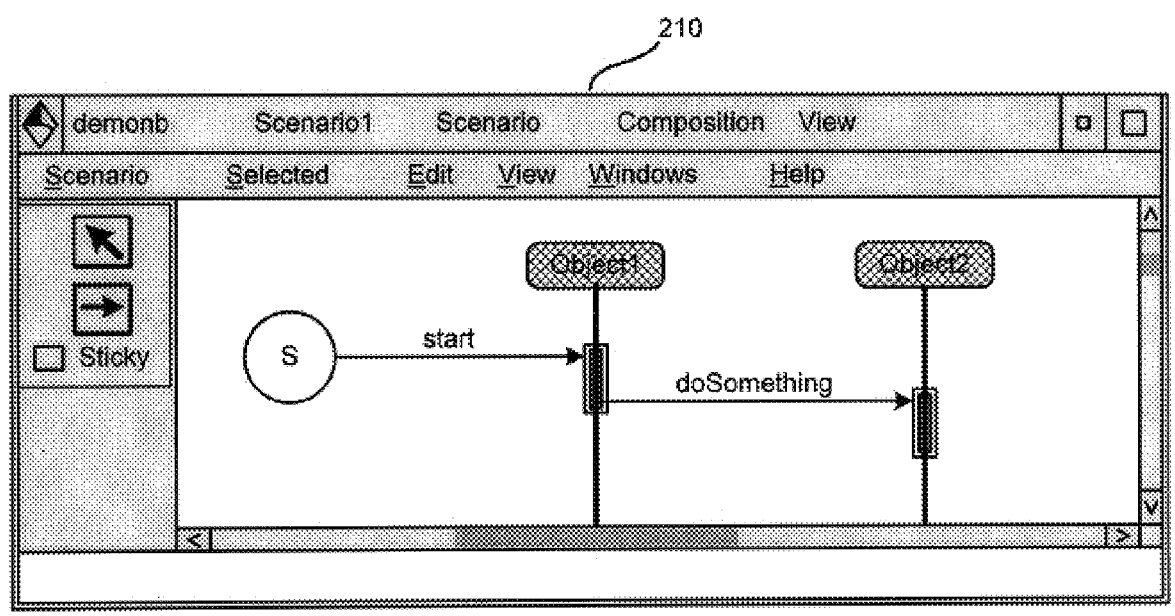

The object modelling tool 112 according to the present invention provides for the creation of Scenarios. A scenario has objects and links between the objects. In the exemplary embodiment presented herein, Scenarios are created in a window called the Scenario Composition View 210. FIG. 3F illustrates a Scenario Composition View 210. The Scenario Composition View 210 acts also as the Index Window to the Object Properties Notebook 212, which is a Multi-Object View, over the same action as the Object Composition View 204. Therefore, whenever the user selects the "Open object properties" action on an object in either the Object Composition View 204 or any of the Scenario Composition Views 210, the Object Properties Notebook 212 will be opened if it is not already, and it will change its contents to show the contents of the selected object.

Examples of View to View Relationships

There may be one-to-one, one-to-many, many-to-one, and many-to-many relationships between the Index Windows and the Multi-Object Views over the same action.

The one-to-one relationship defines the relationship between one Index Window and one Multi-Object View wherein selecting the open action in the Index Window causes the Multi-Object View to change its content to show the newly opened object.

The one-to-many relationship defines the relationship between one Index Window and many Multi-Object Views wherein selecting the open action in the Index Window causes all the Multi-Object Views to change their content to show the newly opened object. For example, one multi-object notebook may be opened at the Attributes page, and another opened at the Methods page. Both multi-object notebooks may be tied to the same Index Window. Upon selecting the open action on an object in this Index Window, both multi-object notebooks change their contents to show the information for the newly selected object. One of them will show the attributes of is the newly opened object and the other will show the methods of the same object. This allows a quick browsing of several categories of information or several types of views simultaneously.

The many-to-one relationship defines the relationship between many Index Windows and a single Multi-Object View. An object may be selected for open in any of the Index Windows and at that point the Multi-Object View is changed to reflect that object's information. This allows the user the ability to view information related to an object from the context of any of the many designated Index Windows. In the exemplary embodiment presented herein, both the Object Composition View 204 and the many Scenario Composition Views 210 are considered Index Windows to the Object Properties View (the Object Properties Notebook 212), over the "Open object properties" action. The user may perform the "Open object properties" action on any object in either of these Index Windows and as a result the Object Properties Notebook 212 (OP View) will change its contents to show the contents of the object selected.

The many-to-many relationship defines the relationship between several Index Windows and several Multi-Object Views. Whenever an object in any of the Index Windows is selected, the contents of all the Multi-Object Windows change to show the newly selected object's information.

Flowcharts

Figure 4:
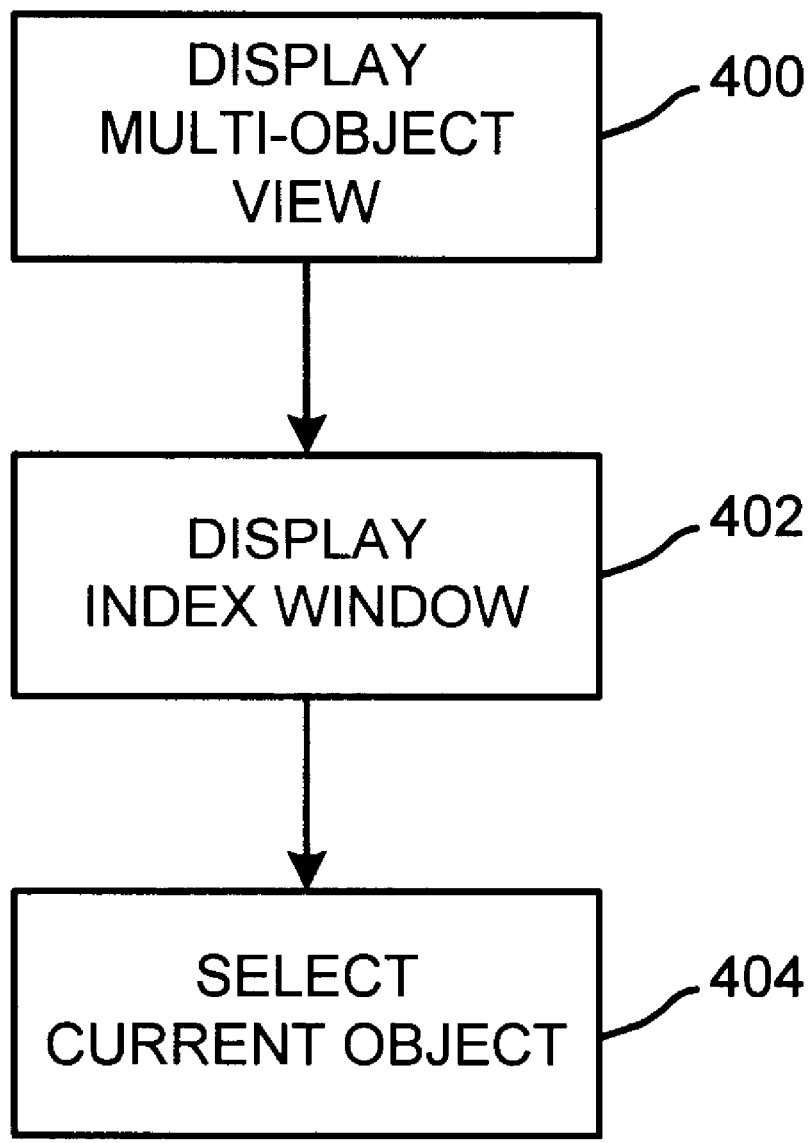
FIG. 4 is a first flowchart illustrating the logic performed by the object modelling tool according to the present invention.

FIG. 4 is a first flowchart illustrating the logic performed by the object modelling tool 112 according to the present invention.

Block 400 represents object modelling tool 112 displaying a multi-object view on a monitor 107 attached to the computer 102. The multi-object view displays information for a current object.

Block 402 represents the object modelling tool 112 displaying an index window on a monitor 107 attached to the computer 102. The index window displays a set of objects.

Block 404 represents the object modelling tool 112 selecting a new current object from a set of objects shown either by the multi-object view or the index window.

Figure 5:
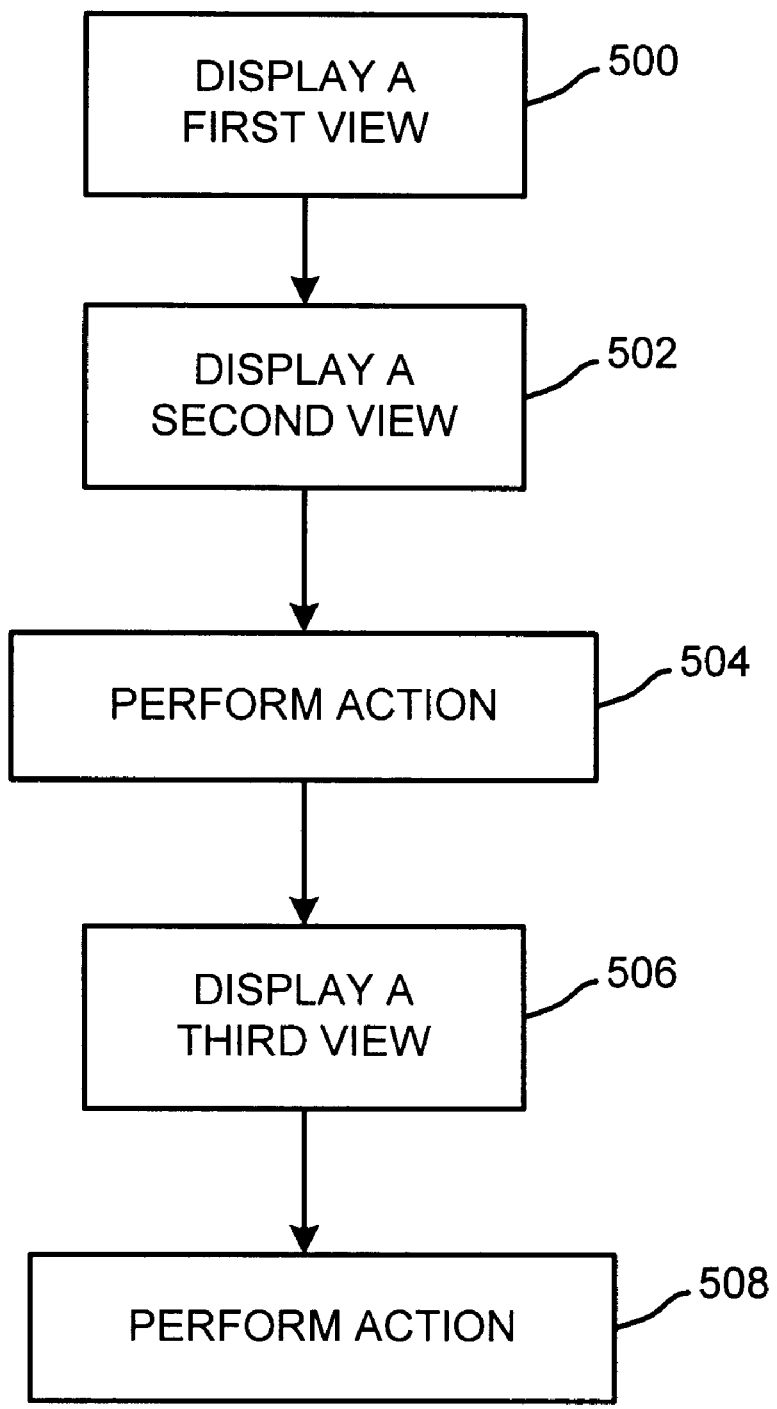
FIG. 5 is a second flowchart illustrating the logic performed by the object modelling tool according to the present invention.

FIG. 5 is a second flowchart illustrating the logic performed by the object modelling tool 112 according to the present invention.

Block 500 represents the object modelling tool 112 graphically displaying a first view (e.g., an Index Window) on a monitor attached to a computer, wherein the first view displays one or more objects therein.

Block 502 represents the object modelling tool 112 graphically displaying a second view (e.g., a Multi-Object View) on the monitor attached to the computer, wherein a specified relationship is defined from the first view to the second view. This relationship may be explicit or implied. Moreover, this relationship may be statically defined (e.g., hard coded) or dynamically defined (e.g., specified by the user). Finally, the relationship may be one-to-one, one-to-many, many-to-one, or many-to-many, as described further below.

Block 504 represents the object modelling tool 112 performing an action in the first view that causes a modification to the second view in accordance with the specified relationship. Note that the second view may be the first view, in which case the modification occurs to the first view.

Block 506 represents the object modelling tool 112 graphically displaying a third view (e.g., either an Index Window or a Multi-Object View) on a monitor attached to a computer, wherein a specified relationship is defined from the second view to the third view. As above, this relationship may be explicit or implied, this relationship may be statically or dynamically defined, and this relationship may be one-to-one, one-to-many, many-to-one, or many-to-many, as described further below.

Block 508 represents the object modelling tool 112 performing an action in the second view that causes a modification to the third view in accordance with the specified relationship. Similar to the first and second view, the third view may be the second view, in which case the modification occurs to the second view.

Figure 6:
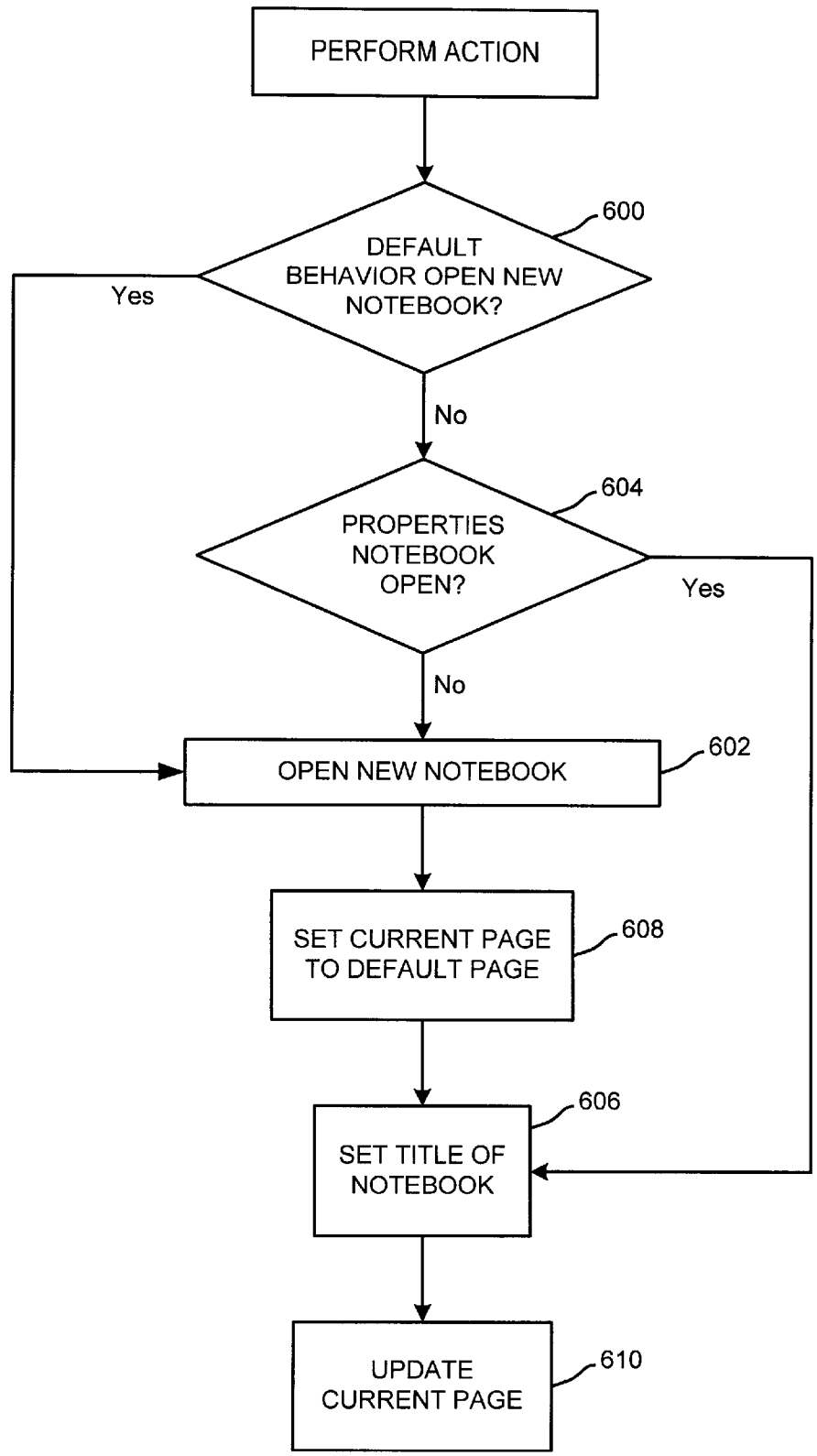
FIG. 6 is a third flowchart illustrating an exemplary action performed by the object modelling tool in response to selecting a new object to open.

FIG. 6 is a third flowchart illustrating an exemplary action performed by the object modelling tool 112 in response to selecting a new object to open.

Block 600 is a decision block that represents the object modelling tool 112 determining whether the default behavior is to open a new notebook when a new object is selected in the index window. If so, block 602 represents the object modelling tool 112 opening a new notebook; otherwise, block 604 represents the object modelling tool 112 determining if an object properties notebook is already open. If so, block 606 represents the object modelling tool 112 setting the title of the notebook; otherwise, block 602 represents the object modelling tool 112 opening a new notebook. Block 608 represents the object modelling tool 112 setting the current page to the default page. Block 606 represents the object modelling tool 112 setting the title of the notebook. Block 610 represents the object modelling tool 112 filling in the contents of the current page with information regarding the new current object.

Implementation

The object modelling tool 112 according to the present invention may define one or more sets of these relationships. The same window may be both the Index Window and the Multi-Object View. Every Index Window (IW) may be implemented as a Notifier object and every Multi-Object View (MOV) may be implemented as an Observer object as specified in the Model-View design pattern, wherein the MOV registers itself as an Observer of the IW with the aspect (if there is an aspect manager) being the action (A) which binds the two in the relationship R {IW,A,MOV}.

The Observer object (MOV) is only interested in notification messages when the user requests the action A be performed on an object in the Notifier object (IW). The data of the notification is the id of the object on which this action is to take place. The sender (IW) id may also be passed to the MOV with the notification's data.

The MOV is a system object which controls a window which may or may not be open. The window is used to display some contents or information related to many objects, one at a time. The object has an attribute CO meaning current object for which the window is currently showing information. When CO is null the window is not displayed. It also responds to the event Selected(Object o), which indicates that object o is selected.

The View to View relationship R is defined as the set (i,a,m) where i is an Index Window (IW), a is an action (A) and m is a Multi-Object View (MOV). The relationship {i,a,m} is defined as following: whenever the user selects Action a to be executed on an object o in Index Window i, a notification is sent to the Multi-Object View m that object o was selected. Upon receiving the notification Selected(o), m creates and shows the window if it is not already shown, created and visible, and then it sets CO=o and changes its contents to reflect the information of object o.

The program has a set of relationships each of the form {i,a,m} as described above. This set may be hard coded in the GUI 100, or, if the GUI 100 allows the user to set these relationships, then there are methods to add and remove relationships to and from the set of relationships. When Action a of {i,a,m} is selected by the user for object obj in Index Window i, the Index Window i sends the notification m→Selected(obj) to each one of the Multi-object views m for which there exists a relationship {i,a,m}.

In the exemplary embodiment of the present invention, the following relationships exist: {Object Composition View, Open object properties, Object Properties Notebook}, {Scenario View, Open object properties, Object Properties Notebook}, and {Class Composition View, Open class properties, Class Properties Notebook}.

Whenever the user selects the action "Open object properties" on object O which is displayed in either Object Composition View window or in a Scenario Composition View window (Index Windows) the Object Properties notebook (Multi-Object View) is opened if it is not already open, it's contents change to show the details of object O (only the front page of the notebook is visibly updated), and the title of the notebook is changed to reflect that it is now showing object O. This is an example of a many-to-one relationship from Index Windows to Multi-Object Views.

Whenever the user selects the action "Open class properties" on class C which is displayed in the Class Composition View 204 (Index Window) the Class Properties Notebook 216 (Multi-Object View) is opened if it is not already open, it's contents change to show the details of class C (only the front page of the notebook is visibly updated), and the title of the notebook is changed to reflect that it is now showing a class C. This is an example of one-to-one relationship from Index Widows to Multi-Object Views.

Pseudo Code

The following is some object-oriented pseudo code for implementing a multi-object view (MOV) class according to is the present invention (only relevant information is shown):

```
class MOV_X        /* some type of a MOV */
{
    data:
        CO;    /* contains the id of the current object    */
               /* (null if none).                           */
        W;     /* The actual window showing contents of     */
               /* CO.                                       */
    methods:
        /* The Selected method is called when the
           user selected Action a on object obj in
           a Index Window i, provided there exists
           a relationship {i,a,m} in this
           application, where m is an instance of
           MOV_X
        */
        Selected(Object obj)
        {
            /* If the window is not open, then create
               and show the window W
            */
            if (CO=null)
                W=MultiObjectNotebook::create( );
            CO = obj;
            /* Send a message to W to display object
               obj
            */
            W.Selected(obj);
        }
        /* The UserClose method is called when the
           user closes the window W
        */
        UserClose
        {
            CO = null;
            W.destroy( );
        }
}
```

The following is object-oriented pseudo code illustrating the methods and data for a window W used by the MOV_X class:

```
class MultiObjectNotebook
{
    data:
        currentPage;    /* the page currently displayed*/
        currentObject;  /* the object currently
                           displayed*/
    methods:
        /* The Create method
        */
        Create( )
        {
            create the window W;
            currentPage = defaultPage; /* default */
            return W;
        }
        /* The Selected method
        */
        Selected(Object obj)
        {
            currentObject = obj;
            replace the current page contents
                with information obtained
                from the object obj;
        }
        /* The Destroy method
        */
```

-continued

```
        Destroy( )
        {
            destroy this window;
        }
        /* The ChangePage method is called when the
           user clicks on a different page's tab
        */
        ChangePage( )
        {
            move the newly selected page to the top;
            show the information of currentObject as
                it pertains to the new page;
        }
}
```

The following is some object-oriented pseudo code for implementing an index window (IW) class according to the present invention (only relevant information is shown):

```
class IndexWindow
{
    data:
            /* The following is an array. An element of
               the array is accessed by using an action
               as a subscript. All user actions that
               are allowed by this index window
               have an entry in this array. Accessing
               RelationArray(Action) retrieves the set
               of all Windows M (or MOV's) for which
               there exists the relationship {I,A,M}
               (with the meaning that was described
               above, where I=this instance of an Index
               Window and A=Action. In other words,
               all the MOV's windows which are affected
               when action "Action" is requested by the
               user from this Index Window are
               contained as a set in the element
               RelationArray(Action). An element
               RelationArray(Action) may be null
               indicating there is no relationship
               defined from this window to any other
               window over action "Action".
            */
        RelationArray;
    methods:
            /* The RespondToUserAction method is called
               when the user requests that action
               "Action" be performed on object "Object"
            */
        RespondToUserAction(Action, Object)
        {
            /* The following statement notifies the
               View that Action was requested to be
               performed on Object. The View m may
               modify its contents to reflect
               information related to Object - it's
               newly selected "current object". (See
               pseudo code for class MOV_X for the
               pseudo code implementation of this
               Selected method).
            */
            for all m in the set
                RelationArray(Action)
                    do m-> Selected(Object);
        }
}
```

Conclusion

This concludes the description of the preferred embodiment of the invention. The present invention discloses a method, apparatus, and article of manufacture for displaying objects in an object-oriented system. A first view is graphically displayed on a monitor attached to a computer, wherein the first view displays one or more objects therein. A second view is also graphically displayed on the monitor attached to the computer, wherein a specified relationship is defined from the first view to the second view. When an action is performed in the first view it causes a modification to the second view in accordance with the specified relationship.

In one embodiment of the present invention, the first view comprises a multi-object view that displays information relating to a current object. The user can then select a new current object from a set of objects shown in the multi-object view.

In another embodiment of the present invention, a second view comprises an index window that displays a set of objects. The user can also select a new current object from the set of objects shown in an index window.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for displaying objects in an object-oriented system, comprising the steps of:
   (a) graphically displaying a first view in a first window on a monitor attached to a computer, wherein the first view in the first window displays one or more objects therein;
   (b) graphically displaying a second view in a second window on the monitor attached to the computer, wherein a specified relationship is defined from the first view to the second view, and wherein the first window and the second window are adapted to be moved in any orientation relative to each other, and the first window and the second window are adapted to be moved independently of each other; and
   (c) performing an action in the first view in the first window that causes a modification to the second view in the second window in accordance with the specified relationship.

2. The method of claim 1 above, further comprising the steps of:
   (d) graphically displaying a third view in a third window on a monitor attached to a computer, wherein a specified relationship is defined from the second view to the third view; and
   (e) performing an action in the second view in the second window that causes a modification to the third view in the third window in accordance with the specified relationship defined from the second view to the third view.

3. The method of claim 1 above, further comprising the step of statically defining the specified relationship from the first view to the second view.

4. The method of claim 1 above, further comprising the step of dynamically defining the specified relationship from the first view to the second view by accepting operator input.

5. The method of claim 1 above, wherein the specified relationship is explicit.

6. The method of claim 1 above, wherein the specified relationship is implied.

7. The method of claim 1, wherein the second view is the first view.

8. The method of claim 1, wherein the specified relationship comprises a one-to-one relationship, and the performing step further comprises the step of updating the second view to display information relating to the new current object.

9. The method of claim 1, wherein the specified relationship comprises a one-to-many relationship, the step of graphically displaying a second view further comprises the step of graphically displaying a plurality of second views, and the step of performing further comprises the step of updating the second views to display information relating to the new current object.

10. The method of claim 1, wherein the specified relationship comprises a many-to-one relationship, the step of graphically displaying a first view further comprises the step of graphically displaying a plurality of first views, and the step of performing further comprises the step of updating the second view to display information relating to the new current object.

11. The method of claim 1, wherein the specified relationship comprises a many-to-many relationship, the step of graphically displaying a first view further comprises the step of graphically displaying a plurality of first views, the step of graphically displaying a second view further comprises the step of graphically displaying a plurality of second views, and the step of performing further comprises the step of updating the second views to display information relating to the new current object.

12. The method of claim 1, further comprising the step of performing a plurality of actions in response to selecting the new current object, wherein the actions are defined by a relationship between the first view and the second window.

13. The method of claim 1, further comprising the step of defining a plurality of relationships between a plurality of the first views and a plurality of second views with respect to a plurality of actions.

14. A method for displaying objects in an object-oriented system, comprising the steps of:
   (a) graphically displaying a multi-object view in a window on a monitor attached to a computer, wherein the multi-object view in the window displays information relating to a current object, wherein the current object is selected from a set of objects listed in a built-in mechanism; and
   (b) selecting a new current object from the set of objects listed in the built-in mechanism.

15. A method for displaying objects in an object-oriented system, comprising the steps of:
   (a) graphically displaying a multi-object view in a first window on a monitor attached to a computer, wherein the multi-object view in the first window displays information relating to a current object;
   (b) graphically displaying an index window on a monitor attached to a computer, wherein the index window displays a set of objects, and wherein the first window and the index window are adapted to be moved in any orientation relative to each other, and the first window and the index window are adapted to be moved independently of each other; and
   (c) selecting a new current object from the set of objects shown by the index window.

16. A computer-implemented apparatus for displaying objects in an object-oriented system, comprising:
   (a) a computer having a monitor attached thereto;
   (b) means, performed by the computer, for graphically displaying a first view in a first window on the monitor attached to the computer, wherein the first view in the first window displays one or more objects therein;
   (c) means, performed by the computer, for graphically displaying a second view in a second window on the monitor attached to the computer, wherein a specified relationship is defined from the first view to the second view, and wherein the first window and the second window are adapted to be moved in any orientation relative to each other, and the first window and the second window are adapted to be moved independently of each other; and (d) means, performed by the computer, for performing an action in the first view in the first window that causes a modification to the second view in the second window in accordance with the specified relationship.

17. A computer-implemented apparatus for displaying objects in an object-oriented system, comprising:

(a) a computer having a monitor attached thereto;

(b) means, performed by the computer, for graphically displaying a multi-object view in a window on a monitor attached to a computer, wherein the multi-object view in the window displays information relating to a current object, wherein the current object is selected from a set of objects listed in a built-in mechanism; and (c) means, performed by the computer, for selecting a new current object from the set of objects listed in the built-in mechanism.

18. A computer-implemented apparatus for displaying objects in an object-oriented system, comprising:

(a) a computer having a monitor attached thereto; and (b) means, performed by the computer, for graphically displaying a multi-object view in a first window on a monitor attached to a computer, wherein the multi-object view in the first window displays information relating to a current object;

(c) means, performed by the computer, for graphically displaying an index window on a monitor attached to a computer, wherein the index window displays a set of objects, and wherein the first window and the index window are adapted to be moved in any orientation relative to each other, and the first window and the index window are adapted to be moved independently of each other; and (d) means, performed by the computer, for selecting a new current object from the set of objects shown by the index window.

19. An article of manufacture comprising a program storage medium readable by a computer having a memory, the medium tangibly embodying one or more programs of instructions executable by the computer to perform method steps for displaying objects in an object-oriented system, the method comprising the steps of:

(a) graphically displaying a first view in a first window on a monitor attached to a computer, wherein the first view in the first window displays one or more objects therein;

(b) graphically displaying a second view in a second window on the monitor attached to the computer, wherein a specified relationship is defined from the first view to the second view, and wherein the first window and the second window are adapted to be moved in any orientation relative to each other, and the first window and the second window are adapted to be moved independently of each other; and (c) performing an action in the first view in the first window that causes a modification to the second view in the second window in accordance with the specified relationship.

20. An article of manufacture comprising a program storage medium readable by a computer having a memory, the medium tangibly embodying one or more programs of instructions executable by the computer to perform method steps for displaying objects in an object-oriented system, the method comprising the steps of:

(a) graphically displaying a multi-object view in a window on a monitor attached to a computer, wherein the multi-object view in the window displays information relating to a current object, wherein the current object is selected from a set of objects listed in a built-in mechanism; and (b) selecting a new current object from the set of objects listed in the built-in mechanism.

21. An article of manufacture comprising a program storage medium readable by a computer having a memory, the medium tangibly embodying one or more programs of instructions executable by the computer to perform method steps for displaying objects in an object-oriented system, the method comprising the steps of:

(a) graphically displaying a multi-object view in a first window on a monitor attached to a computer, wherein the multi-object view in the first window displays information relating to a current object;

(b) graphically displaying an index window on a monitor attached to a computer, wherein the index window displays a set of objects, and wherein the first window and the index window are adapted to be moved in any orientation relative to each other, and the first window and the index window are adapted to be moved independently of each other; and (c) selecting a new current object from the set of objects shown by the index window.

22. The computer-implemented apparatus of claim 16 above, further comprising:

(d) means, performed by the computer, for graphically displaying a third view on a monitor attached to a computer, wherein a specified relationship is defined from the second view to the third view; and (e) means, performed by the computer, for performing an action in the second view that causes a modification to the third view in accordance with the specified relationship defined from the second view to the third view.

23. The computer-implemented apparatus of claim 16 above, further comprising means, performed by the computer, for statically defining the specified relationship from the first view to the second view.

24. The computer-implemented apparatus of claim 16 above, further comprising means, performed by the computer for dynamically defining the specified relationship from the first view to the second view by accepting operator input.

25. The computer-implemented apparatus of claim 16 above, wherein the specified relationship is explicit.

26. The computer-implemented apparatus of claim 16 above, wherein the specified relationship is implied.

27. The computer-implemented apparatus of claim 16 above, wherein the second view is the first view.

28. The computer-implemented apparatus of claim 16 above, wherein the specified relationship comprises a one-to-one relationship, and the means, performed by the computer, for performing further comprises the means for updating the second view to display information relating to the new current object.

29. The computer-implemented apparatus of claim 16 above, wherein the specified relationship comprises a one-to-many relationship, the means, performed by the computer, for graphically displaying a second view further comprises the means for graphically displaying a plurality of second views, and the means for performing further comprises the means for updating the second views to display information relating to the new current object.

30. The computer-implemented apparatus of claim 16 above, wherein the specified relationship comprises a many-to-one relationship, the means, performed by the computer, for graphically displaying a first view further comprises the means for graphically displaying a plurality of first views, and the means for performing further comprises the means for updating the second view to display information relating to the new current object.

31. The computer-implemented apparatus of claim 16 above, wherein the specified relationship comprises a many-to-many relationship, the means, performed by the computer, for graphically displaying a first view further comprises the means for graphically displaying a plurality of first views, the means for graphically displaying a second view further comprises the means for graphically displaying a plurality of second views, and the means for performing further comprises the means for updating the second views to display information relating to the new current object.

32. The computer-implemented apparatus of claim 16 above, further comprising the means for performing a plurality of actions in response to selecting the new current object, wherein the actions are defined by a relationship between the first view and the second window.

33. The computer-implemented apparatus of claim 16 above, further comprising the means for defining a plurality of relationships between a plurality of the first views and a plurality of second views with respect to a plurality of actions.

34. The method of claim 19 above, further comprising the steps of:

(d) graphically displaying a third view on a monitor attached to a computer, wherein a specified relationship is defined from the second view to the third view; and (e) performing an action in the second view that causes a modification to the third view in accordance with the specified relationship defined from the second view to the third view.

35. The method of claim 19 above, further comprising the step of statically defining the specified relationship from the first view to the second view.

36. The method of claim 19 above, further comprising the step of dynamically defining the specified relationship from the first view to the second view by accepting operator input.

37. The method of claim 19 above, wherein the specified relationship is explicit.

38. The method of claim 19 above, wherein the specified relationship is implied.

39. The method of claim 19 above, wherein the second view is the first view.

40. The method of claim 19 above, wherein the specified relationship comprises a one-to-one relationship, and the performing step further comprises the step of updating the second view to display information relating to the new current object.

41. The method of claim 19 above, wherein the specified relationship comprises a one-to-many relationship, the step of graphically displaying a second view further comprises the step of graphically displaying a plurality of second views, and the step of performing further comprises the step of updating the second views to display information relating to the new current object.

42. The method of claim 19 above, wherein the specified relationship comprises a many-to-one relationship, the step of graphically displaying a first view further comprises the step of graphically displaying a plurality of first views, and the step of performing further comprises the step of updating the second view to display information relating to the new current object.

43. The method of claim 19 above, wherein the specified relationship comprises a many-to-many relationship, the step of graphically displaying a first view further comprises the step of graphically displaying a plurality of first views, the step of graphically displaying a second view further comprises the step of graphically displaying a plurality of second views, and the step of performing further comprises the step of updating the second views to display information relating to the new current object.

44. The method of claim 19 above, further comprising the step of performing a plurality of actions in response to selecting the new current object, wherein the actions are defined by a relationship between the first view and the second window.

45. The method of claim 19 above, further comprising the step of defining a plurality of relationships between a plurality of the first views and a plurality of second views with respect to a plurality of actions.

* * * * *

UNITED STATES PATENT AND TRADEMARK OFFICE
CERTIFICATE OF CORRECTION

PATENT NO. : 5,917,498
DATED : June 29, 1999
INVENTOR(S) : Roni Korenshtein

It is certified that error appears in the above-identified patent and that said Letters Patent is hereby corrected as shown below:

Claim 22, Line 35, delete "(d)" and replace with --(e)--

Claim 22, Line 39, delete "(e)" and replace with --(f)--

Signed and Sealed this

Eighth Day of February, 2000

Attest:

Q. TODD DICKINSON

Attesting Officer          Commissioner of Patents and Trademarks